United States Patent Office 3,409,617
Patented Nov. 5, 1968

3,409,617
PESTICIDAL TRIAZINYL PHOSPHORIC
ACID ESTERS
Friedrich Wolf, Leipzig, Siegfried Heidenreich, Bitterfeld, and Manfred Born, Halle, Germany, assignors to VEB Farbenfabrik Wolfen, Wolfen, Germany
No Drawing. Filed Feb. 25, 1966, Ser. No. 529,973
4 Claims. (Cl. 260—248)

ABSTRACT OF THE DISCLOSURE

A compound of the formula

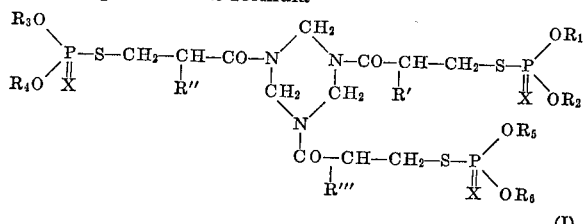

wherein R', R", R''' represent hydrogen or a lower alkyl radical, and $R_1$ to $R_6$ lower alkyl radicals, and X stands for sulphur or oxygen. The invention also comprises a process for making the novel compounds, which are active ingredients of pesticides of low toxicity to humans and warm-blooded animals.

---

The present invention relates to novel pesticides compounds forming the active ingredients of low toxicity.
The general formula of these compounds is as follows:

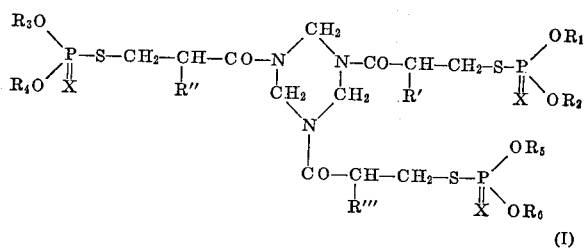

wherein R', R" and R''' represent hydrogen, or a lower alkyl radical, $R_1$ to $R_6$ lower alkyl radicals, and X stands for S or O.

It has been found that the compounds which are symbolized by the above formula are well suited as pesticides. While they have high insecticide activity, they are well tolerated by plants and have low toxicity as far as higher animals are concerned. Whereas most of the known and commercially used thio- and dithio esters of phosphoric acid when orally administered, exhibit toxicity to rats at values of 2.3 and 500 mg./kg. rat (see T. B. Gaines, Toxiol. a. Applied Pharmacol. 2, 88–99 (1960), the thio- and dithio-esters of phosphoric acid made in accordance with the present invention exhibit no toxic effect on oral administration at 5000 to 10,000 mg./kg. rate.

The new compounds according to the invention can be made by adding one mol of a 1.3.5-tris-acryloyl-hexahydro-s-triazine of the formula

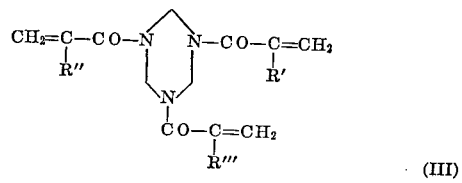

wherein R', R" and R''' are hydrogen, or a lower alkyl radical, to three mols of identical or different thiol phosphoric acid esters or thionothiol phosphoric acid esters, having the grouping

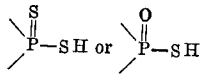

the compounds of Formula III are easily obtained from formaldehyde and acrylonitrile, or substituted acrylonitrile.

The above described addition reaction of the phosphoric acid esters to the compounds of Formula III proceeds easily, already at room temperature, with generation of heat. The reaction is carried out preferably at temperatures between 20 and 150° C. and in presence of inert solvents or diluents, e.g., chloroform, dimethyl formamide, benzene, acetonitrile, acetone, and methylethyl ketone. Addition of catalytic amounts of a tertiary amine, e.g., trimethylamine, will accelerate the addition reaction.

It is furthermore possible to use simultaneously a polymerization decelerator, such as hydroquinone, in order to avoid polymerization of the 1.3.5-tris-acryloyl-hexahydro-s-triazines.

According to the process of the invention, the esters are obtained in good yield and high purity, partly as oils of a light yellow color and practically without odor, partly as colorless crystalline substances.

The products obtained are effective ingredients for pest control, in the usual formulations for instance as powder, pouring or spraying agents, if desired in combination with other effective ingredients.

In the following the preparation of the pesticides according to the invention will be described in a number of examples which are given by way of illustration and not of limitation, but it should be understood that many changes in the details can be made without departing from the spirit of the invention.

Example I

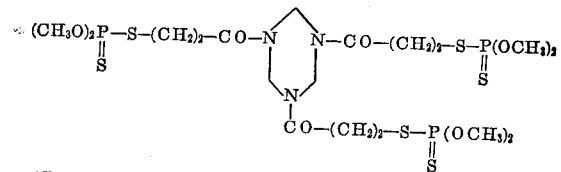

47 grams (0.3 mol) dithio-phosphoric acid-O.O-dimethyl ester are added drop by drop, while stirring, at 25° C. to a solution of 24.9 grams (0.1 mol) of 1.3.5-tris-acryloyl-hexahydro-s-triazine, 0.2 gram hydroquinone and 0.3 ml. triethylamine in 200 ml. chloroform, whereby the temperature rises to 60° C.

At 60° C. stirring is continued for 2 hours; thereafter the mixture is cooled and washed with 10% soda solution and water, dried with sodium sulfate, filtered and distilled in vacuo to dryness. Obtained are in this manner 65 grams (91% of the theoretical) of the new ester as a viscous oil of light yellow color.

Example II

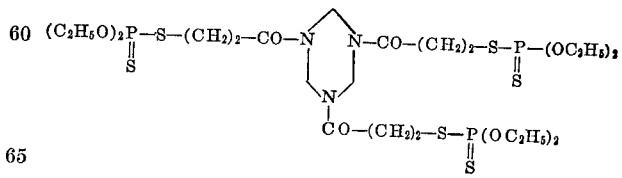

24.9 grams (0.1 mol) 1.3.5-tris-acryloyl-hexahydro-s-triazine, are dissolved in 150 ml. chloroform. To this are added while stirring at 20° C., 55.8 grams (0.3 mol) dithio-phosphoric acid-O.O-diethyl ester, whereby the temperature rises to about 55° C. Stirring is continued for another 3 hours at 50° C., whereafter the solvent is distilled off in vacuo. The oily residue is washed with 10% soda solution and water, whereby a thick mash of crystals is formed. When recrystallized from ethanol, 68.5° grams (85% of the theoretical) colorless crystals are obtained having a melting point of 58° C.

Example III $$(i\text{-}C_3H_7O)_2\overset{\text{S}}{\underset{\|}{P}}\text{-S-}(CH_2)_2\text{-CO-N}\underset{\underset{\overset{|}{CO\text{-}(CH_2)_2\text{-S-}\overset{\text{S}}{\underset{\|}{P}}(OC_3H_7\text{-}i)_2}}{N}}{\overbrace{\phantom{XXXX}}}\text{N-CO-}(CH_2)_2\text{-S-}\overset{\text{S}}{\underset{\|}{P}}(OC_3H_7\text{-}i)_2$$

To a solution of 24.9 grams (0.1 mol) 1.3.5-tris-acryl-oyl-hexahydro-s-triazine, 0.1 gram hydroquinone and 0.3 ml. triethylamine in 200 ml. chloroform we add drop by drop while stirring 64.2 grams (0.3 mol) dithio-phosphoric acid-O.O-diisopropylester at 20° C. Heating is continued to 70° C. for one hour and the obtained mixture is worked up as described in Example I. Obtained are 82 grams (92% of the theoretical) of the new ester in the form of a light yellow oil.

Example IV $$(C_2H_5O)_2\overset{\text{O}}{\underset{\|}{P}}\text{-S-}(CH_2)_2\text{-CO-N}\underset{\underset{\overset{|}{CO\text{-}(CH_2)_2\text{-S-}\overset{}{\underset{}{P}}(OC_2H_5)_2}}{N}}{\overbrace{\phantom{XXXX}}}\text{N-CO}(CH_2)_2\text{-S-}\overset{}{\underset{}{P}}(OC_2H_5)_2$$

24.9 grams (0.1 mol) 1.3.5-tris-acryloyl-hexahydro-s-triazine are dissolved in 150 ml. chloroform. To this are added drop by drop 51 grams (0.3 mol) O.O-diethyl-thiolphosphoric acid ester at 25° C. The temperature rises to 50° C. whereupon heating is continued for 3 hours to 60 to 70° C. and further workup is carried out in a conventional manner. Obtained are 47 grams of the new ester (63% of the theoretical) as a yellow oil.

Example V $$(CH_3O)_2\overset{\text{S}}{\underset{\|}{P}}\text{-S-}CH_2\text{-}\underset{\overset{|}{CH_3}}{CH}\text{-CO-N}\underset{\underset{\overset{|}{CO\text{-}CH\text{-}CH_2\text{-S-}P(OCH_3)_2}}{N}}{\overbrace{\phantom{XXXX}}}\text{N-CO-}\underset{\overset{|}{CH_3}}{CH}\text{-CH}_2\text{-S-}\overset{\text{S}}{\underset{\|}{P}}(OCH_3)_2$$

14.5 grams (0.5 mol) 1.3.5-tris-(α-methyl-acryloyl)-hexahydro-s-triazine are suspended in 70 ml. acetone. At 20° C. we add while stirring 23.7 grams (0.15 mol) dithio-phosphoric acid O.O-dimethylester. After a short time a clear solution is formed while the temperature rises to 35° C. Stirring is continued for 4 hours at 50 to 60° C. and workup is done in the conventional manner. Obtained are 27 grams of the new ester (71% of the theoretical) of a viscous oil of light yellow color.

Example VI

Some selected compounds were tested for insecticidal action on house flies (*Musca domestica*) and on grain weevils (*Sitophilus granarius*) in acetonic solution. Effective amount is indicated in μg./cm.² Further tests were made with flour beetles larvae (*Tribolium confusum*) as effective agent in wheat flour. The active agent is given in percent.

The effective degree was determined on grain weevils and flies after 18 hours, on the flour beetle larvae after an exposure time of 10 days.

| Compound | Applied Against | Active Agent (in μg./cm.²) or Percent | Effectiveness (in percent) |
|---|---|---|---|
| Example 1 | *M. domestica* | 12.5 | 100 |
|  | *T. confusum* | 0.2 | 100 |
| Example 5 | *M. domestica* | 12.5 | 100 |
|  | *T. confusum* | 0.5 | 100 |
| Example 4 | *M. domestica* | 12.5 | 100 |
|  | *S. granarius* | 130 | 90 |
|  | *T. confusum* | 0.5 | 100 |

What we claim is:

1. A compound of the formula $$R_3O\diagdown\atop{R_4O\diagup}\underset{X}{P}\text{-S-CH}_2\text{-}\underset{R''}{CH}\text{-CO-N}\underset{\underset{\underset{\underset{R'''}{|}}{\underset{CO\text{-}CH\text{-}CH_2\text{-S-P}}{N}}}{CH_2\diagup\diagdown CH_2}}{\overbrace{\underset{CH_2\diagdown\diagup CH_2}{\phantom{XXX}}}}\text{N-CO-}\underset{R'}{CH}\text{-CH}_2\text{-S-P}\diagup^{OR_1}_{OR_2}$$

wherein R', R'', R''' represent hydrogen or a lower alkyl radical, and $R_1$ to $R_6$ lower alkyl radicals, and X stands for sulphur or oxygen.

2. The process for making a compound as claimed in claim 1, wherein 1 mol of an unsaturated compound of the formula $$H_2C=\underset{R''}{C}\text{-CO-N}\underset{\underset{\underset{R'''}{|}}{\underset{CO\text{-C}=CH_2}{N}}}{\overbrace{\underset{CH_2\diagdown\diagup CH_2}{\phantom{XXX}}}}\text{N-CO-}\underset{R'}{C}=CH_2$$

wherein R', R'', R''' represent hydrogen or a lower alkyl radical, are reacted with 3 mols of thiol- or thionothiol-phosphoric acid ester which contain the grouping $$\diagdown\underset{\diagup}{\overset{\text{O}}{\underset{\|}{P}}}\text{-SH or }\diagdown\underset{\diagup}{\overset{\text{O}}{\underset{\|}{P}}}\text{-SH}$$

the reaction being carried out in a solvent or diluent at a temperature ranging from 20° to 150°.

3. The process according to claim 2, wherein the reaction is carried out in the presence of a tertiary amine as a catalyst.

4. The process according to claim 2, wherein the reaction is carried out in the presence of a polymerization decelerator.

References Cited

UNITED STATES PATENTS

| | | | |
|---|---|---|---|
| 2,568,620 | 9/1951 | Gresham et al. | 260—248 |
| 2,881,201 | 4/1959 | Schrader | 260—248 XR |
| 3,185,699 | 5/1965 | Sherlock | 260—248 XR |

HENRY R. JILES, *Primary Examiner.*

J. M. FORD, *Assistant Examiner.*